(No Model.)
R. C. KENNEDY.
EYEGLASSES.
No. 408,109. Patented July 30, 1889.
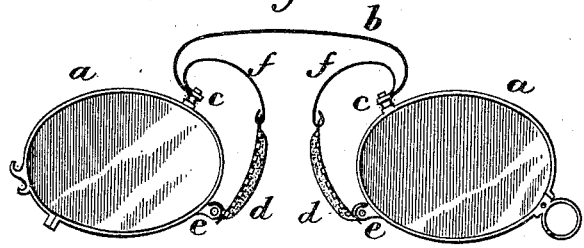
Fig. 1.
    
Fig. 2.  Fig. 3.  Fig. 4.  Fig. 5.  Fig. 6.
    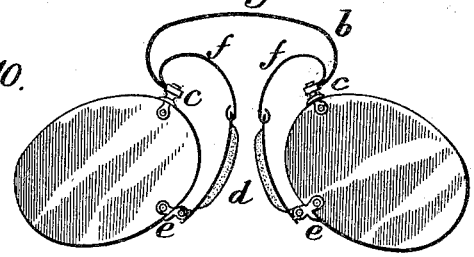
Fig. 7.  Fig. 8.  Fig. 9.  Fig. 10.  Fig. 11.
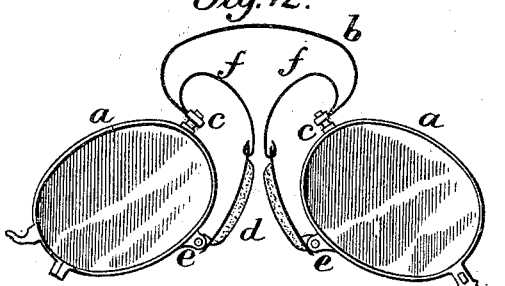 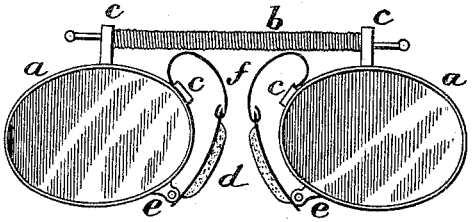
Fig. 12.  Fig. 13.
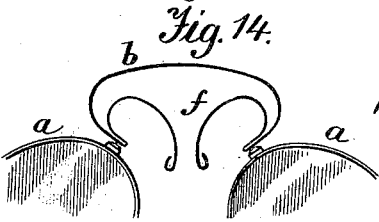
Fig. 14.
Witnesses:
A. Ruppert
E. Kruse
Inventor:
Robert C. Kennedy
by Gtt. W. T. Howard
Atty.

UNITED STATES PATENT OFFICE.

ROBERT C. KENNEDY, OF NEW YORK, N. Y.

EYEGLASSES.

SPECIFICATION forming part of Letters Patent No. 408,109, dated July 30, 1889.

Application filed March 29, 1889. Serial No. 305,302. (No model.)

*To all whom it may concern:*

Be it known that I, ROBERT CLARKE KENNEDY, of the city, county, and State of New York, have invented certain new and useful Improvements in Eyeglasses, of which the following is a specification, reference being had to the accompanying drawings, and to the letters of reference marked thereon.

This invention relates to an improved construction and arrangement of the nose-pieces of an eyeglass, whereby they will automatically produce the requisite pressure upon the nose, hold the eyeglass firmly or easily in position, and admit of ready adaptation to any shape of nose.

In the accompanying drawings, Figure 1 shows a front view of a pair of eyeglasses having my invention applied thereto. Figs. 2, 3, 4, 5, 6, 7, 8, 9, and 10 represent details hereinafter described. Figs. 11, 12, and 13 show the application of my invention to eyeglasses of other known constructions. Fig. 14 shows a modification.

Similar letters of reference indicate similar parts in the respective figures.

Referring to Fig. 1, $a\ a$ represent the lens-frames, and $b$ shows the ordinary bow spring or bar, attached at its respective ends to the frames $a\ a$ at the upper posts $c$. The said posts are soldered or secured to the frames $a$ in any known manner. The attachment of the bow spring or bar to the upper posts $c$ is accomplished by means of screws, pins, or caps of any ordinary character.

Heretofore, so far as my information extends, the nose-pieces have been attached so as to cause the pressure exerted by them to be dependent largely upon the power of the bow spring or bar $b$, the result being an undue and uncomfortable pressure upon the nose of the wearer.

By the use of my invention the pressure upon the nose is relieved without reducing the strength of the top spring or bar. In order to effect this result I attach the lower end of each of the nose-pieces $d$ to the lower post $e$ by an open ring or hook, as shown in Fig. 2, or a closed or solid ring, as shown in Fig. 3, a suitable pin being used, whereby the movement of the nose-piece upon the pin is perfectly free. The upper end of each nose-piece $d$ may be variously constructed—that is, with a square opening, Fig. 4, a round opening, Fig. 5, or a hook or ring, Fig. 6, and to the upper end of each of said nose-pieces the lower end of an automatically-acting detachable spring $f$ is fastened, the other or upper end of each spring being secured to one of the upper posts $c$ or to the bow-spring or bar $b$.

Figs. 7, 8, 9, and 10 exhibit various constructions of the automatically-acting detachable springs, Figs. 7 and 8 showing, respectively, a flat and curled hook, and Figs. 9 and 10, respectively, a square and a round opening, each for attachment to the nose-piece, as above stated. The springs $f$ may be readily detached, being made interchangeable with springs of a similar character, but of different curvature, whereby any desired pressure or fit of nose may be obtained. The result of this general construction is that two easily-acting springs are formed, which increase in strength or power of action as the connecting-points between the springs $f$ and nose-pieces $d$ move apart by being slipped over the nose of the wearer. By the pivotal attachment of the lower ends of the nose-pieces to the lower posts $e$ the nose-pieces have a free revolving motion instead of the ordinary spring or lever action or movement, which occurs when the lower ends of the nose-pieces are made fast or immovable. The nose-pieces and the automatically-acting detachable springs can be readily replaced at any time and others either hooked, pinned, or screwed in their places. The nose-pieces can be made from any of the materials ordinarily employed in such manufacture, and the springs from gold, silver, or other metal, rubber, celluloid, &c.

Figs. 11, 12, and 13 show the application of my invention to eyeglasses of other ordinary constructions, the mode of attachment and the principle of action remaining as in the adaptation shown in Fig. 1.

Fig. 14 shows a modification in which the springs $f$ are formed from the extended ends of the bow-spring.

Having described my invention, I claim—

1. The combination, with the lens-frames and the connecting bow-spring, of nose-pieces pivoted at their lower ends on the lower portions of the lens-frames, and springs independent of the bow-spring connected at their lower ends to the upper ends of the nose-pieces and at their other ends to the upper portions of the lens-frames, substantially as specified.

2. The combination, with the lens-frames and the connecting bow-spring, of nose-pieces detachably pivoted at their lower ends to posts on the lower portions of the lens-frames, and springs, independent of the bow-spring, detachably connected at their lower ends to the upper ends of the nose-pieces and at their other ends to posts on the upper portions of the lens-frames, substantially as specified.

3. The combination, with the lens-frames and the bow-spring connecting the same, of nose-pieces pivoted to the lower portions of the lens-frames, and automatically-acting springs curved upward and outward from the upper ends of the nose-pieces to the upper portions of the lens-frames at the points at which the ends of the bow-spring are attached, substantially as described.

In testimony whereof I have hereunto set my hand and seal.

ROBERT C. KENNEDY. [L. S.]

Witnesses:
C. C. CAPES,
F. T. JONES.